United States Patent Office 3,346,247
Patented Oct. 10, 1967

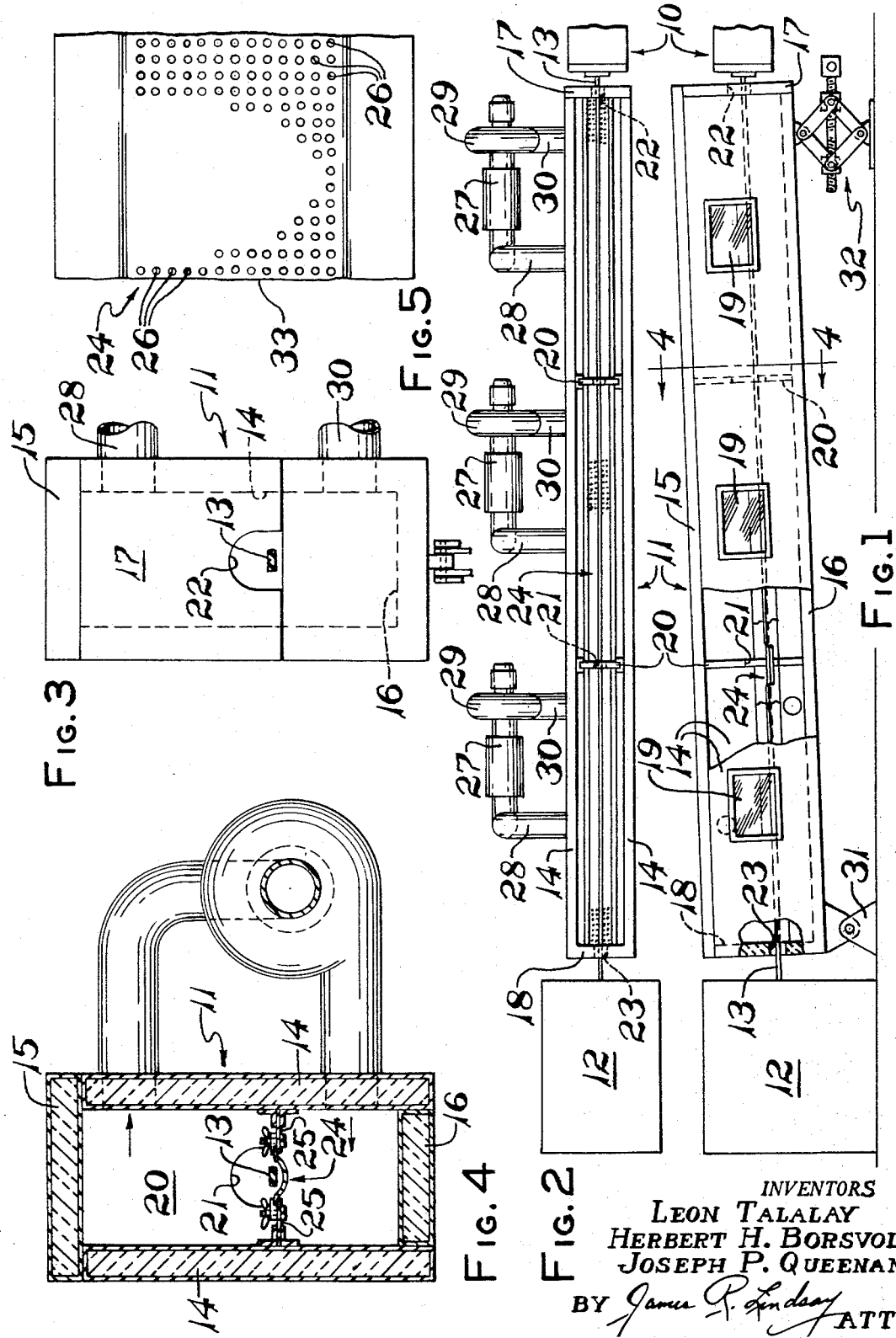

3,346,247
HEATING APPARATUS FOR RUBBER OR
RUBBER-LIKE STRIP MATERIAL
Leon Talalay, Woodbridge, Herbert H. Borsvold, Orange, and Joseph P. Queenan, Bridgeport, Conn., assignors to The B. F. Goodrich Company, New York, N.Y., a corporation of New York
Filed July 27, 1965, Ser. No. 475,219
5 Claims. (Cl. 263—3)

ABSTRACT OF THE DISCLOSURE

A rubber or rubber-like strip is advanced through a heating chamber while being supported on a cushion of air. The heating chamber is separated into an upper section and lower section by a perforated plenum plate. Air under pressure is introduced into the lower section of the heating chamber and passes through the perforations in the plenum plate into the upper section of the heating chamber to form the cushion of air for supporting the strip. The central longitudinal zone of the plenum plate is concave-shaped to cause the strip to advance along a desired path through the chamber. The plenum plate slopes downwardly from the forward end of the heating chamber toward the rear end of the chamber to cause the strip to advance through the chamber without externally-applied force.

---

This invention relates to the manufacture of rubber or rubber-like strip material and pertains more particularly to the conveyance of rubber or rubber-like strip material through a heating zone.

In the manufacture of rubber strip material other than by molding the product in a closed mold, a suitable rubber composition is fed through an extruder provided with an appropriately shaped die to form a strip of desired cross-sectional configuration. The extruded rubber strip then is conveyed through a heating chamber in order to transform the rubber stock into a desired cured condition. If a cellular rubber product is preferred a chemical blowing agent is included in the rubber composition so that as the extruded strip is conveyed through the heating zone the chemical blowing agent is caused to decompose to effect the expansion of the rubber composition into a cellular structure. Whether the resulting chemically blown rubber has an interconnecting cellular structure (open-cell sponge) or is composed of a non-communicating cellular structure (closed-cell sponge) depends largely upon the physical properties of the rubber composition at the time it is expanded. If the rubber composition is quite plastic and has little strength when it is expanded, an intercommunicating cellular structure normally will be formed. In making a closed-cell gas-expanded rubber, the rubber usually is partially vulcanized (at a temperature below that at which the blowing agent decomposes) before the rubber composition is expanded in order to strengthen the rubber and prevent the rupture of the cell walls as the rubber is blown. Whether the rubber composition is partially vulcanized or not during its advance through the heating zone, it still is sufficiently plastic before being fully cured that it cannot be supported on a conventional conveyor belt as it is advanced through the heating zone without the strip material becoming distorted in shape merely because of its own weight. If the strip material is conveyed on a conveyor belt, it assumes a flattened cross-sectional shape (as compared to its original extruded cross-sectional shape) and normally has a flat surface along the zone where it rested on the conveyor belt surface. In addition, if the strip material is to be expanded into a cellular structure during its conveyance through the heating zone, the frictional contact of the rubber strip with the conveyor belt prevents the rubber composition from expanding uniformly in all directions causing additional distortion of the rubber strip.

Various proposals have been made for reducing the degree of distortion experienced when advancing the rubber strip supported on a conveyor belt through the heating zone. One such proposal was to advance the rubber strip material through the heating zone on a vibrator conveyor which would advance the strip material by periodically tossing it upwardly and forwardly, the surface contact of the strip material with the conveyor surface being periodically broken when the strip material is so tossed. The momentary suspension of the strip material in the air as a result of this tossing action does reduce the degree of distortion experienced when merely conveying the strip material on a conventional conveyor belt but does not eliminate distortion entirely.

Another proposal for reducing distortion of the strip material involved the use of an open mesh conveyor belt and the use of air jets positioned at spaced intervals beneath the open mesh conveyor belt and positioned so that blasts of air could be directed intermittently through the open mesh belt. The intermittent blasts of air through the open mesh belt were intended to periodically break contact between the strip material and the open mesh conveyor belt upon which the strip material was supported during the advance of the strip material through the heating zone. While the momentary breaking of contact of the strip material with the conveyor belt does reduce the degree of distortion experienced when the strip material merely is supported through the heating zone on a conventional conveyor, this manner of conveyance of the strip material through the heating zone also does not eliminate distortion entirely.

It has been found that the objectionable distortion can be completely eliminated only when the extruded rubber strip is suspended in space during its entire conveyance through the heating zone so that while the rubber composition still is plastic and in a flowable condition it is allowed to expand and/or be vulcanized free of rigid external support. The present invention permits the rubber strip material to be so suspended. In accordance with the present invention, the rubber or rubber-like strip material is suspended on a cushion of air throughout its entire advance through the heating zone in which it is partially vulcanized and/or gas-expanded into a cellular structure and/or vulcanized to its final cure and/or normalized to relieve any stresses remaining in the strip material which would tend to cause shrinkage. The strip material may be formed by extrusion (although other appropriate methods for forming the rubber composition into a strip may be employed) and may be made as a continuous strip or be made in preselected lengths.

The invention will be more fully understood from the following detailed description of an embodiment of the invention and by referring to the drawing in which:

FIG. 1 is a side elevation view, partly broken away and in section, of apparatus which embodies the present invention;

FIG. 2 is a plan view of the apparatus shown in FIG. 1 with the top plate of the heating chamber removed;

FIG. 3 is an enlarged front elevation view of the heating chamber of the apparatus shown in FIG. 1;

FIG. 4 is an enlarged view on the line 4—4 of FIG. 1; and

FIG. 5 is a plan view of the perforated plenum plate employed in the heating chamber of the apparatus shown in FIG. 1.

Referring to the drawing, the apparatus there depicted comprises three components, namely an extruder 10 provided with an approximately shaped die, a heating chamber 11 and a normalizing chamber 12 in which the rubber strip material 13 is further heated after leaving heating chamber 11 to complete the cure of the rubber or rubber-like composition from which the strip material 13 is formed and/or to relieve any shrinkage stresses present in the strip material if curing of the composition was not completed or stress relieving was not accomplished completely in heating chamber 11.

Heating chamber 11 is an elongated chamber comprised of side walls 14, 14, top plate 15 (which is shown as being removable to allow access to the interior of the chamber 11), bottom plate 16, front wall 17 (which is shown to be comprised of two sections) and back wall 18, all of which are provided with sufficient heat-insulation to prevent objectionable heat loss through the walls of the chamber. One or both of the side walls 14, 14 desirably are furnished with one or more windows 19, 19 through which an operator can view the interior of heating chamber 11. The heating chamber 11 can be divided into several compartments by vertical transverse partitions 20, 20 to allow heating zones of different temperature to exist through which the strip material 13 is advanced as it is conveyed through the chamber 11, the apparatus illustrated having two such partitions 20, 20 separating the chamber 11 into three compartments. Each partition 20, 20 is provided with an opening 21 through which the strip material 13 passes as it is advanced from one compartment into an adjacent compartment. The front wall 17 also is provided with an opening 22 through which the strip material 13 is fed from the extruder 10 into heating chamber 11, and back wall 18 is provided with an opening 23 through which the strip material 13 passes as it is discharged from heating chamber 11. The heating chamber 11 is divided longitudinally into an upper section and the lower section by a transversely disposed perforated plenum plate 24 which rests upon and is detachably secured to supporting plates 25, 25. The perforations 26, 26 in plenum plate 24 allow heated air introduced under pressure into the lower section of the heating chamber 11 to escape into the upper section of the heating chamber 11 and suspend the entire length of the strip material 13 confined within the heatiing chamber 11 on a cushion of air, as will be explained in greater detail hereinafter.

The heating chamber 11 is heated to the desired temperature (or temperatures) by heating systems positioned at intervals along the length of the chamber 11. If the heating chamber is divided into several compartments by partitions 20, 20, a separate heating system preferably is provided for each compartment so that the temperature can be different in each compartment. Even if the heating chamber 11 is not partitioned (through use of vertical partitions 20, 20) into more than one compartment, it, nevertheless, is desirable to employ several heating systems spaced along the length of the heating chamber 11 to insure a fairly equal temperature throughout the length of the chamber. The heating system depicted includes a heater 27 which heats the air delivered to it through conduit 28 from the upper section of chamber 11. The heated air then is drawn from heater 27 into blower 29 and thereafter is discharged under pressure into the lower section of chamber 11 through conduit 30.

The rear end of the heating chamber 11 is pivotally mounted on bracket 31 while the front end of the heating chamber 11 is mounted to a jack assembly which allows the front end of the chamber 11 to be raised to a height above the rear end of the chamber 11 whereby the chamber 11 and, as a consequence, plenum plate 24 slope downwardly as they extend rearwardly from the front of the chamber 11. The desirability for having the chamber 11 so canted will be discussed hereinafter.

The perforations 26, 26 are provided in the central longitudinally extending region 33 of the plenum plate 24 which underlies the desired path of conveyance in chamber 11 along which the strip material 13 is to be advanced. The said central region 33 of plenum plate 24 desirably is concaved downwardly, as shown in FIG. 4, to maintain the strip material 13 centered over the perforated central region 33 as it moves through the heating chamber 11. The central region 33 is provided with a uniform pattern of the closely-spaced perforations 26, 26 to provide a uniform lifting force (derived from the hot air rising under pressure up through the perforations) suitable for suspending the strip material 13 on a cushion of air rather than on the plenum plate 24. It will be appreciated that the strip material 13 will not be distorted as a result of frictional engagement with a non-yielding supporting surface if it is suspended in air and, as a result, can expand (or contract) freely without restraint. The central region 33 of the plenum plate 24 desirably has a void area (the "void area" being the area of the central region 33 of the plenum plate represented by the perforations as compared to the area of the same central region of the plenum plate if it were not perforated) of from 1 to 10%, although it will be understood that the percent of void area required to suspend the strip material 13 will depend somewhat on the cross-sectional size and weight per unit length of the strip material 13 being conveyed through the chamber 11, as well as the differential in pressure of the heated air between the lower section and upper section of the chamber 11 on either side of plenum plate 24.

The reason for canting the heating chamber 11, and consequently the plenum plate 24, downwardly as they extend from the forward end of the chamber 11 to the discharge end of the chamber 11 is to cause the strip material 13 to advance through the heating chamber 11 without the need for pulling it through and/or pushing it through the chamber. It was found that when the plenum plate 24 is sloped, as shown, the gravitational force exerted on the strip material 13 confined within the chamber 11 may be considered to comprise a horizontal component which causes the strip material 13 to slide down the cushion of air supporting the strip material 13 toward the rear end of the heating chamber 11 thereby causing the strip material 13 to advance through the chamber 11. It is not desirable to pull the strip material 13 through the heating chamber 11 since to do so may result in stretching the strip material 13, nor is it desirable to push it through the chamber 11 since such action also is liable to cause distortion. The natural flow of the strip material 13 down the inclined cushion of air, however, causes no distortion. The degree of cant imparted to the heating chamber 11 may be varied depending upon the rate at which it is desired to advance the strip material 13 through the heating chamber 11, although a slope (with respect to the horizontal) of between $\frac{1}{10}°$ and 6° normally is employed.

When it is desired to employ the heating chamber 11, the strip material 13 (which, as explained above, may be formed in a continuous length by extruder 10 or in preselected lengths) is fed through opening 22 in front wall 17 into the zone immediately above the perforations 26, 26 in plenum plate 24 and onto the cushion of air resulting from the discharge of heated air from the lower section of the heating chamber 11 into the upper section of the heating chamber 11 through perforations 26, 26 of plenum plate 24. The strip material 13 thereafter is maintained suspended upon the cushion of air and floats downwardly through the openings 21 in vertical partitions 20, 20 and through opening 23 in the back wall 18 of the chamber 11. The strip material 13 upon being discharged from chamber 11 then is fed into normalizer chamber 12, if additional heating of the strip material 13 is desired.

The temperature (or temperatures) to be employed in the heating chamber 11 will vary, of course, depending upon the operation (or operations) to be performed by the chamber 11. For example, if the strip material 13 is to be partially vulcanized, expanded, and further vulcanized in the chamber 11 depicted in the drawing, the initial compartment of chamber 11 into which the strip material 13 is introduced would be maintained at a temperature sufficient to cause the rubber composition from which the strip material 13 is formed to obtain a partial cure as it is advanced therethrough but not sufficiently high to cause the blowing agent in the rubber composition to decompose. The temperature in the next compartment would be sufficient to cause decomposition of the blowing agent in the rubber composition in order to cause the rubber composition to expand into a cellular structure. The temperature in the last compartment would be maintained sufficiently high to cause the expanded rubber composition to cure to the desired degree. To illustrate, the temperature in the compartment in which partial vulcanization is to take place may be 250° F. (provided a blowing agent is used that does not decompose at 250° F. or below), the temperature in the middle compartment may be 280° F. (provided a blowing agent that decomposes between 250°–280° F. is used), and the temprature in the last compartment may be 300° F.

The size and spacings of the perforations 26, 26 and/or the pressures in the upper and lower sections of the chamber will be varied, of course, depending upon the shape and weight of the strip material 13 desired to be conveyed through the chamber 11. Perforations 1/32 inch in diameter on 1/8 inch centers are suitable for supporting strip material which upon completion forms closed-cell tubular products that range in size from tubes having 1/2" I.D. with a 1/4 inch wall thickness to tubes having 7/8" I.D. with a 1/4 inch wall thickness.

The dwell time in the heating chamber 11 will depend, of course, on the length of the chamber 11 itself and on the speed at which the strip material 13 flows down the cushion of air in its advance through the chamber 11. The rate of advance of the strip material 13 through the chamber 11 can be increased by raising the front end of the chamber 11 in order to increase the cant which the chamber 11 makes with the horizontal.

The strip material may be formed in various cross-sectional shapes varying from simple rectangular or circular cross-sections to the complex cross-sections used in refrigerator gasketing and automobile weather stripping.

While in the embodiment of this invention that has been shown and described the perforations 26, 26 are shown to be of uniform size and spacing throughout the entire perforated zone of the plenum plate 24, it will be appreciated that perforations of uniform size and spacing need not be employed throughout to obtain the desired floating of the strip material on a cushion of air as the strip material is advanced through the heating chamber. Thus, perforations of varying size and spacing may be used in the plenum plate, so long as the entire zone of the plenum plate beneath the desired path of advance of the strip material is perforated sufficiently to provide the essential cushion of air for suspending the strip material out of contact with the plenum plate during the advance of the strip material through he heating chamber. Indeed, zones of different void areas can be provided along the length of the plenum plate for compensating for changes in the density of the strip material as it expands or for conveying the strip material at different heights above the plenum plate in different zones of the heating chamber.

It also will be appreciated that, instead of raising or lowering the front end of the heating chamber 11 (the back end of the heating chamber being pivotally mounted), other arrangements for providing the desired cant to the heating chamber can be employed. For example, the front end of the heating chamber can be pivotally mounted in an elevated position and means for raising or depressing the back end of the heating chamber can be provided.

We claim:
1. Apparatus useful for the manufacture of rubber or rubber-like strip material which comprises a heating chamber through which the strip material advances and in which the strip material is heated, said heating chamber being separated into an upper section and a lower section by a plenum plate extending transversely between te side walls of the heating chamber and extending longitudinally from the front wall of the heating chamber to the back wall of the heating chamber, said front wall of said heating chamber being provided with an opening positioned adjacent one end of said plenum plate for allowing the strip material to be fed into the zone immediately above the upper surface of said plenum plate, said back wall of said heating chamber being provided with an opening positioned adjacent the other end of said plenum plate through which the strip material can be discharged from the heating chamber, the central longitudinally-extending zone of the said plenum plate being concaved downwardly and having closely-spaced perforations therein spaced in a uniform pattern extending throughout its length and through which air under pressure can escape from said lower section in said heating chamber into the said upper section in said heating chamber, means for continuously introducing air into the said lower section of the heating chamber under a pressure sufficiently greater than the pressure of the air in the said upper section of the heating chamber that the velocity of the air passing continuously through the said perforations in the said plenum plate from the said lower section to the said upper section of the heating chamber is sufficient to suspend the strip material above the said perforations in the said plenum plate and out of contact with the said plenum plate, means for heating the air introduced into the said lower section of the heating chamber, said heating chamber being canted with respect to the horizontal so that the heating chamber and plenum plate slope downwardly from the forward end of the heating chamber into which the strip material is fed toward the rear end of the heating chamber from which the strip material is discharged whereby the strip material will flow naturally when suspended on the cushion of air emitted through the said perforations in the plenum plate toward the discharge end of the heating chamber.

2. Apparatus useful for the manufacture of rubber or rubber-like strip material which comprises a heating chamber through which the strip material advances and in which the strip material is heated, said heating chamber being separated into an upper section and a lower section by a plenum plate extending transversely between te side walls of the heating chamber and extending longitudinally from the front wall of the heating chamber to the back wall of the heating chamber, said front wall of said heating chamber being provided with an opening positioned adjacent one end of said plenum plate for allowing the strip material to be fed into the zone immediately above the upper surface of said plenum plate, said back wall of said heating chamber being provided with an opening positioned adjacent the other end of said plenum plate through which the strip material can be discharged from the heating chamber, the central longitudinally-extending zone of the said plenum plate being concaved downwardly and having closely-spaced perforations therein spaced in a uniform pattern extending throughout its length and through which air under pressure can escape from the said lower section in said heating chamber into the said upper section in said heating chamber, said central zone of said plenum plate having a void area resulting from said perforations of from 1 to 10 percent, means for continuously introducing air into the said lower section of the heating chamber under a pressure sufficiently greater than the pressure of the air in the said upper section of the heating chamber that the velocity of the air passing continuously through the said perforations in the said plenum plate from the said lower section to the said upper section of the heating chamber is sufficient to suspend the strip material above the said perforations in the said plenum plate and out of contact with the said plenum plate, means for heating the air introduced into the said lower section of the heating chamber, said heating chamber being canted with respect to the horizontal so that the heating chamber and plenum plate slope downwardly from the forward end of the heating chamber into which the strip material is fed toward the rear end of the heating chamber from which the strip material is discarged wereby the strip material will flow naturally when suspended on the cushion of air emitted through the said perforations in the plenum plate toward the discharge end of the heating chamber.

3. Apparatus useful for the manufacture of rubber or rubber-like strip material which comprises a heating chamber through which the strip material advances and in which the strip material is heated, said heating chamber being separated into an upper section and a lower section by a plenum plate extending transversely between the side walls of the heating chamber and extending longitudinally from the front wall of the heating chamber to the back wall of the heating chamber, said front wall of said heating chamber being provided with an opening positioned adjacent one end of said plenum plate for allowing the strip material to be fed into the zone immediately above the upper surface of said plenum plate, said back wall of said heating chamber being provided with an opening positioned adjacent the other end of said plenum plate through which the strip material can be discharged from the heating chamber, the central longitudinally-extending zone of the said plenum plate being concaved downwardly and having closely-spaced perforations therein spaced in a uniform pattern extending throughout its length and through which air under pressure can escape from the said lower section in said heating chamber into the said upper section in said heating chamber, means for continuously introducing air into the said lower section of the heating chamber under a pressure sufficiently greater than the pressure of the air in the said upper section of the heating chamber that the velocity of the air passing continuously through the said perforations in the said plenum plate from the said lower section to the said upper section of the heating chamber is sufficient to suspend the strip material above the said perforations in the said plenum plate and out of contact with the said plenum plate, means for heating the air introduced into the said lower section of the heating chamber, said heating chamber being canted with respect to the horizontal so that the heating chamber and plenum plate slope downwardly from the forward end of the heating chamber into which the strip material is fed toward the rear end of the heating chamber from which the strip material is discharged whereby the strip material will flow naturally when suspended on the cushion of air emitted through the said perforations in the plenum plate toward the discharge end of the heating chamber, the degree of cant of the said plenum plate with the horizontal being from $\frac{1}{10}°$ to $6°$.

4. Apparatus useful for the manufacture of rubber or rubber-like strip material which comprises a heating chamber through which the strip material advances and in which the strip material is heated, said heating chamber being separated into an upper section and a lower section by a plenum plate extending transversely between the side walls of the heating chamber and extending longitudinally from the front wall of the heating chamber to the back wall of the heating chamber, said front wall of said heating chamber being provided with an opening positioned adjacent one end of said plenum plate for allowing the strip material to be fed into the zone immediately above the upper surface of said plenum plate, said back wall of said heating chamber being provided with an opening positioned adjacent the other end of said plenum plate through which the strip material can be discharged from the heating chamber, the central longitudinally-extending zone of the said plenum plate being concaved downwardly and having closely-spaced perforations therein spaced in a uniform pattern extending throughout its length and through which air under pressure can escape from the said lower section in said heating chamber into the said upper section in said heating chamber, means for continuously introducing air into the said lower section of the heating chamber under a pressure sufficiently greater than the pressure of the air in the said upper section of the heating chamber that the velocity of the air passing continuously through the said perforations in the said plenum plate from the said lower section to the said upper section of the heating chamber is sufficient to suspend the strip material above the said perforations in the said plenum plate and out of contact with the said plenum plate, vertical partitioning means for dividing said heating chamber into several compartments and means for heating the air introduced into the lower section of each compartment to a different temperature, said heating chamber being canted with respect to the horizontal so that the heating chamber and plenum plate slope downwardly from the forward end of the heating chamber into which the strip material is fed toward the rear end of the heating chamber from which the strip material is discharged whereby the strip material will flow naturally when suspended on the cushion of air emitted through the said perforations in the plenum plate toward the discharge end of the heating chamber.

5. Apparatus useful for the manufacture of rubber or rubber-like strip material which comprises a heating chamber through which the strip material advances and in which the strip material is heated, said heating chamber being separated into an upper section and a lower section by a plenum plate extending transversely between the side walls of the heating chamber and extending longitudinally from the front wall of the heating chamber to the back wall of the heating chamber, said front wall of said heating chamber being provided with an opening positioned adjacent one end of said plenum plate for allowing the strip material to be fed into the zone immediately above the upper surface of said plenum plate, said back wall of said heating chamber being provided with an opening positioned adjacent the other end of said plenum plate through which the strip material can be discharged from the heating chamber, the central longitudinally-extending zone of the said plenum plate being concaved downwardly and having closely-spaced perforations therein extending throughout its length and through which air under pressure can escape from the said lower section in said heating chamber into the said upper section in said heating chamber, said central zone of said plenum plate having a void area resulting from said perforations of from 1 to 10 percent, means for continuously introducing air into the said lower section of the heating chamber under a pressure sufficiently greater than the pressure of the air in the said upper section of the heating chamber that the velocity of the air passing continuously through said perforations in the said plenum plate from the said lower section to the said upper section of the heating chamber is sufficient to suspend the strip material above the said perforations in the said plenum plate and out of contact with the said plenum plate, means for heating the air introduced into the said lower section of the heating chamber, said heating chamber being canted with respect to the horizontal so that the heating chamber with plenum plate slope downwardly from the forward end of the heating chamber into which the strip material is fed toward the rear end of the heating chamber from which the strip material is discharged whereby the strip material will flow naturally when suspended on the cushion of air emitted through the said perforations in the plenum plate toward the discharge end of the heating chamber.

(References on following page)

References Cited

UNITED STATES PATENTS

| | | | |
|---|---|---|---|
| 1,973,059 | 9/1934 | Gerke | 18—2 |
| 2,211,490 | 8/1940 | Braun | 34—156 X |
| 2,316,664 | 4/1943 | Brassert et al. | 263—21 |
| 3,061,940 | 11/1962 | Cichelli | 34—156 |
| 3,082,541 | 3/1963 | Moore et al. | 34—156 |
| 3,198,499 | 8/1965 | Stanley | 263—3 |

FOREIGN PATENTS 829,912　3/1960　Great Britain.

FREDERICK L. MATTESON, Jr., *Primary Examiner.*

D. A. TAMBURRO, *Assistant Examiner.*